(12) United States Patent
Balenda, II et al.

(10) Patent No.: US 11,761,524 B2
(45) Date of Patent: Sep. 19, 2023

(54) ELECTRONIC LOCKING DIFFERENTIAL

(71) Applicant: AMERICAN AXLE & MANUFACTURING, INC., Detroit, MI (US)

(72) Inventors: Joseph S. Balenda, II, Grand Blanc, MI (US); Stephen C. Doud, Lake Orion, MI (US); Joseph C. P. Eickholt, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 17/944,639

(22) Filed: Sep. 14, 2022

(65) Prior Publication Data

US 2023/0088870 A1  Mar. 23, 2023

Related U.S. Application Data

(60) Provisional application No. 63/245,994, filed on Sep. 20, 2021.

(51) Int. Cl.
| *F16H 48/08* | (2006.01) |
| *F16H 48/34* | (2012.01) |
| *F16H 48/24* | (2006.01) |
| *F16D 27/00* | (2006.01) |

(52) U.S. Cl.
CPC ....... *F16H 48/08* (2013.01); *F16D 2027/008* (2013.01); *F16H 48/24* (2013.01); *F16H 2048/346* (2013.01)

(58) Field of Classification Search
CPC .. F16D 27/09; F16D 27/118; F16D 2027/008; F16H 48/24; F16H 48/34; F16H 2048/346; F16H 48/08–2048/087
See application file for complete search history.

(56) References Cited

U.S. PATENT DOCUMENTS

| 5,989,147 | A  | 11/1999 | Forrest et al. |
| 6,551,209 | B2 | 4/2003  | Cheadle et al. |
| 6,958,030 | B2 | 10/2005 | DeGowske |
| 7,022,040 | B2 | 11/2006 | DeGowske et al. |
| 7,211,020 | B2 | 5/2007  | Gohl et al. |
| 7,241,243 | B2 | 7/2007  | Duncan |
| 7,399,248 | B2 | 7/2008  | Kleinhans et al. |
| 7,425,185 | B2 | 9/2008  | Donofrio et al. |
| 7,887,450 | B2 | 2/2011  | Fusegi et al. |
| 7,988,584 | B2 | 8/2011  | Balenda, II et al. |
| 8,167,764 | B2 | 5/2012  | Balenda, II et al. |
| 8,454,471 | B2 | 6/2013  | Isken, II et al. |

(Continued)

*Primary Examiner* — Ernesto A Suarez
*Assistant Examiner* — James J Taylor, II
(74) *Attorney, Agent, or Firm* — REISING ETHINGTON P.C.

(57) ABSTRACT

An electronic locking differential that includes a movable electromagnet to selectively operate a dog clutch for locking a side gear to a carrier. The dog clutch includes a dog member having a plurality of legs that extend through leg apertures in the carrier. A cam mechanism is employed on the legs and the carrier to generate and apply a force to the dog member to maintain the dog member in an engaged position when torque is transmitted through the cam mechanism. The carrier is configured with an annular rib that surrounds a pocket. The annular rib has a frustoconical shape that matches that of a pole piece on the electromagnet. The electromagnet is received into the pocket when the electromagnet is operated and the dog member is in its engaged position.

14 Claims, 9 Drawing Sheets

(56) References Cited

U.S. PATENT DOCUMENTS

| | | |
|---|---|---|
| 8,591,375 B2 | 11/2013 | Maruyama et al. |
| 8,858,384 B2 | 10/2014 | Fusegi et al. |
| 8,926,471 B2 | 1/2015 | Yamanaka et al. |
| 9,212,704 B2 | 12/2015 | Andonian et al. |
| 9,500,268 B2 | 11/2016 | Balenda, II |
| 9,797,495 B2 | 10/2017 | Inose et al. |
| 10,385,928 B2 | 8/2019 | Yamanaka et al. |
| 10,391,861 B2 | 8/2019 | Richards et al. |
| 10,465,784 B2 | 11/2019 | Komatsu |
| 10,571,009 B2 | 2/2020 | Komatsu |
| 10,663,052 B2 | 5/2020 | Balenda, II |
| 10,982,744 B2 | 4/2021 | Johnson et al. |
| 11,118,664 B2 | 9/2021 | Zink et al. |
| 11,118,666 B2 | 9/2021 | Richards et al. |

ELECTRONIC LOCKING DIFFERENTIAL

CROSS-REFERENCE TO RELATED APPLICATIONS

This application claims the benefit of U.S. Provisional Application No. 63/245,994 filed Sep. 20, 2021, the disclosure of which is incorporated by reference as if fully set forth in detail herein.

FIELD

The present disclosure relates to an electronic locking differential.

BACKGROUND

This section provides background information related to the present disclosure which is not necessarily prior art.

Locking differentials are employed in vehicle drive lines to inhibit speed differentiation between a pair of driven vehicle wheels, typically in situations where one vehicle wheel is susceptible to slipping and enhanced traction is desired. Locking differentials commonly employ a dog clutch that is selectively engaged to lock a side gear of a differential gearset to a carrier or differential case that houses the differential gearset. Such configurations can employ a first dog member, which has a plurality of dog clutch teeth and is non-rotatably coupled to the side gear, and a second dog member that has a plurality of mating dog clutch teeth and is non-rotatably but axially slidably coupled to the carrier. The second dog member can be positioned along the rotational axis of the carrier in a first position, where the mating dog clutch teeth are disengaged from the dog clutch teeth so that the dog clutch does not inhibit relative rotation between the side gear and the carrier, and a second position where the mating dog clutch teeth are engaged with the dog clutch teeth so that the dog clutch inhibits relative rotation between the side gear and the carrier.

During the operation of this type of locking differential, the forces that act on the dog clutch teeth and the mating dog clutch teeth include vector components that tend to urge the second dog member axially away from the first dog member (i.e., toward the first position of the second dog member). In situations where a relatively large amount of torque is transmitted through the dog clutch, these vector components can become relatively large. One strategy for counteracting these vector components involves the use of a relatively powerful actuator that is employed to move the second dog member. More specifically, the actuator can be "oversized" so that it generates sufficient load to not only move the second dog member, but also to generate sufficient force to overcome the vector components and hold the second dog member in the second position.

U.S. Pat. No. 7,074,150 discloses a locking differential with an electromagnetic actuator and a dog clutch. A cam mechanism is integrated into the second dog member and the carrier and is employed to generate canceling forces that reduce the vector components that tend to drive the second dog member away from the first dog member. While such configuration reduces the need for "oversizing" the actuator that is used to move the second dog member, we note that a relatively large space is required for the integration of the actuator and cam mechanism into the locking differential.

SUMMARY

This section provides a general summary of the disclosure, and is not a comprehensive disclosure of its full scope or all of its features.

In one form, the present disclosure provides an electronic locking differential that includes a carrier, a differential gearset, a first dog member, a second dog member, a cam mechanism, a spring and an electromagnet. The carrier is rotatable about a differential axis and defines an interior cavity, an actuator hub, a plurality of leg apertures and a circumferentially extending projection. The actuator hub has an exterior hub surface that is disposed concentrically about the differential axis. The leg apertures are spaced apart about the differential axis and each of the leg apertures intersects the interior cavity. The circumferentially extending projection is coaxial with the exterior hub surface and has a radially inward side that defines a first frustoconical surface. An annular pocket is formed radially between the exterior hub surface and the first frustoconical surface. The differential gearset is received in the interior cavity and includes a side gear that is rotatable relative to the carrier about the differential axis. The first dog member is fixedly coupled to the side gear and has a plurality of first teeth. The second dog member is received in the internal cavity and has a body and plurality of legs. The body defines a plurality of second teeth. Each of the legs is fixedly coupled to the body and is received through an associated one of the leg apertures. Each of the legs has a distal end that is opposite the body and which is cylindrically shaped, The second dog member is axially movable along the differential axis between a first position, in which the second teeth are disengaged from the first teeth, and a second position in which the second teeth are engaged with the first teeth. The cam mechanism has a plurality of cams and a plurality of followers. Each of the cams is formed on a corresponding one of the legs at a location between the body and the cylindrically shaped distal end. Each of the followers is fixedly coupled to the carrier and disposed in the interior cavity. Each of the cams is engagable to an associated one of the followers. The spring biases the second dog member along the differential axis toward the first position. The electromagnet is slidably disposed on the actuator hub. The electromagnet has a pole piece and a plunger that is fixedly coupled to the pole piece. The pole piece defines a second frustoconical surface. The plunger abuts axial end surfaces of the distal ends of the legs. The electromagnet is operable in an energized state to create a magnetic field that draws the second frustoconical surface on the pole piece toward the first frustoconical surface to correspondingly move the second dog member toward the second position. At least a portion of the electromagnet is disposed in the annular pocket when the electromagnet is operated to create the magnetic field and the second dog member is in the second position. The cam mechanism is configured to urge the second dog member toward the first dog member when a torque that is greater than or equal to a first predetermined threshold is transmitted through the cam mechanism in a first predetermined rotational direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 12:
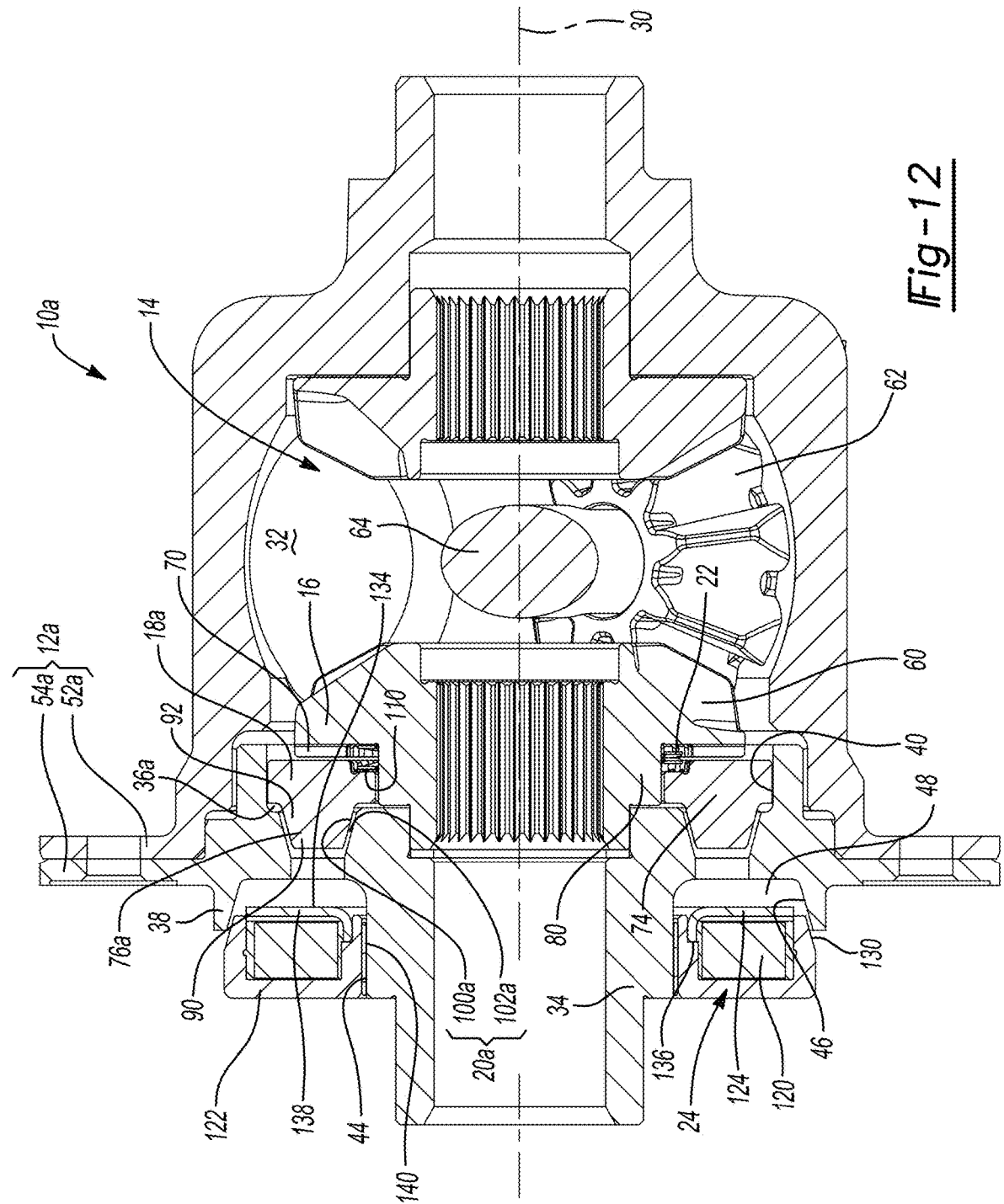
Figure 13:
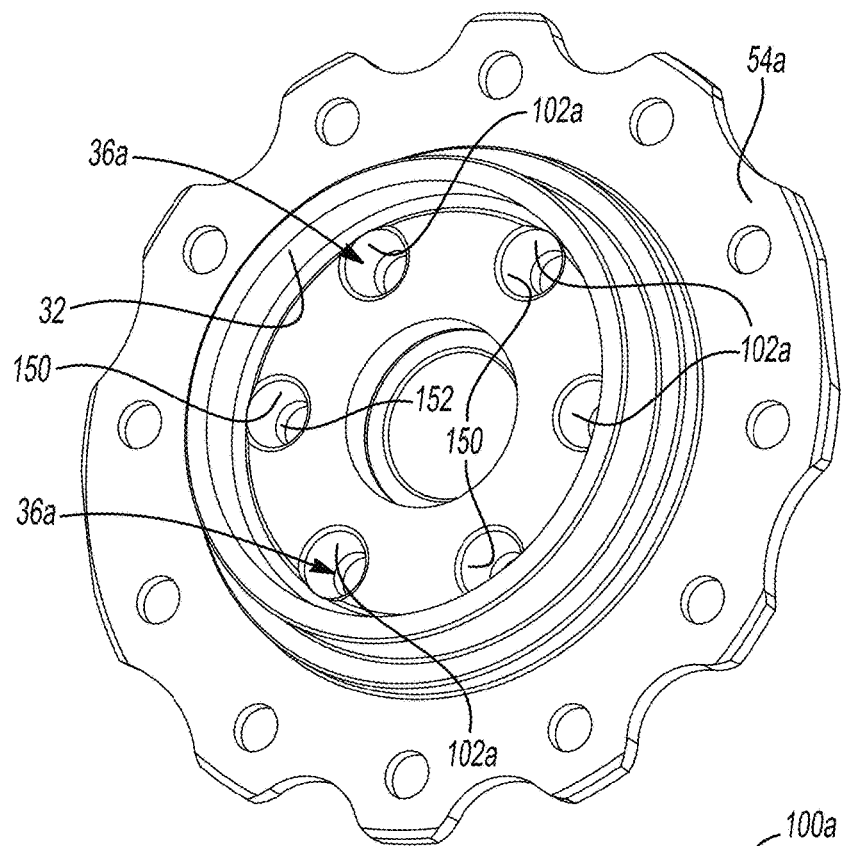
Figure 14:
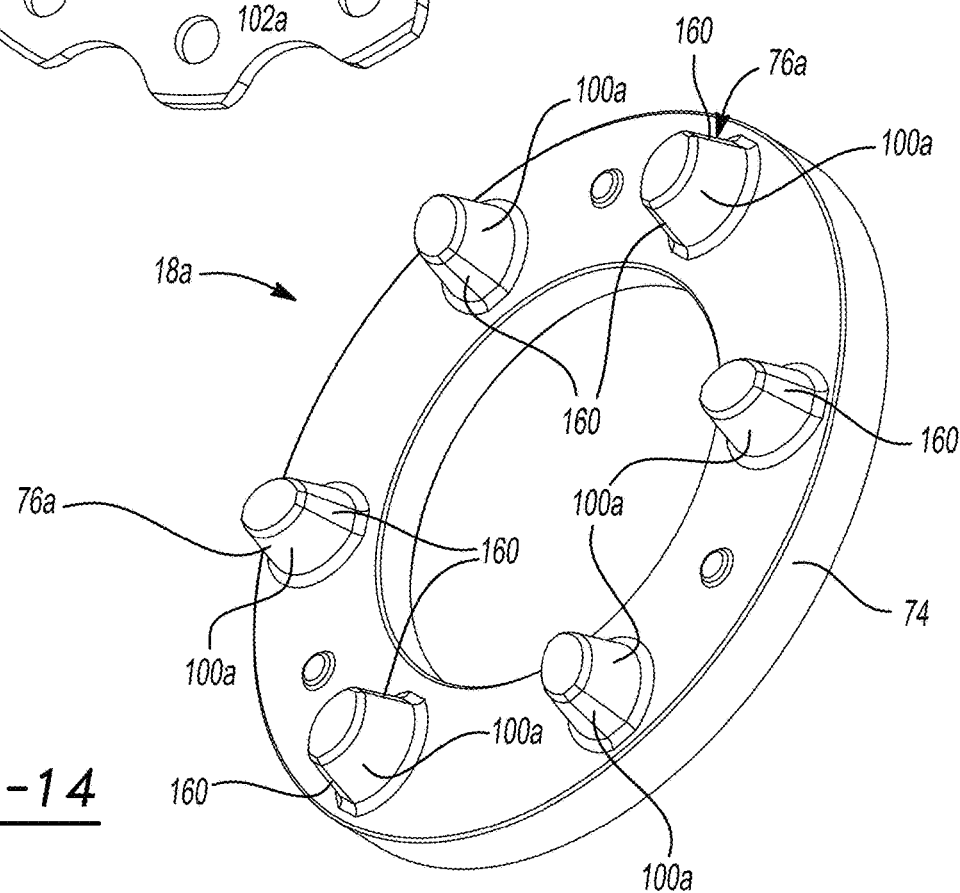

FIG. 12 is a section view of a second exemplary electronic locking differential constructed in accordance with the teachings of the present disclosure FIG. 13 is a perspective view of a portion of the locking differential of FIG. 12, illustrating a cover of a carrier and cam followers of a cam mechanism in more detail; and FIG. 14 is a perspective view of a portion of the locking differential of FIG. 12, illustrating a second dog member and cam members of the cam mechanism in more detail.

Corresponding reference numerals indicate corresponding parts throughout the several views of the drawings.

DETAILED DESCRIPTION

Figure 1:
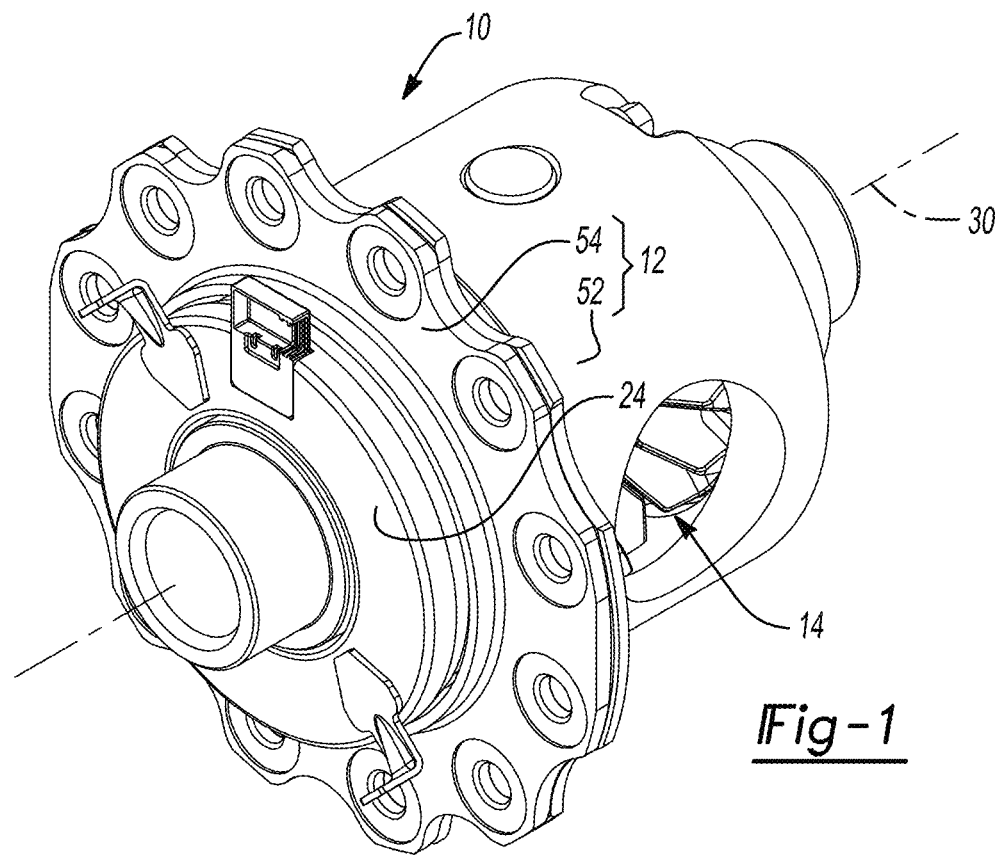
FIG. 1 is a perspective view of an exemplary electronic locking differential constructed in accordance with the teachings of the present disclosure.
Figure 2:
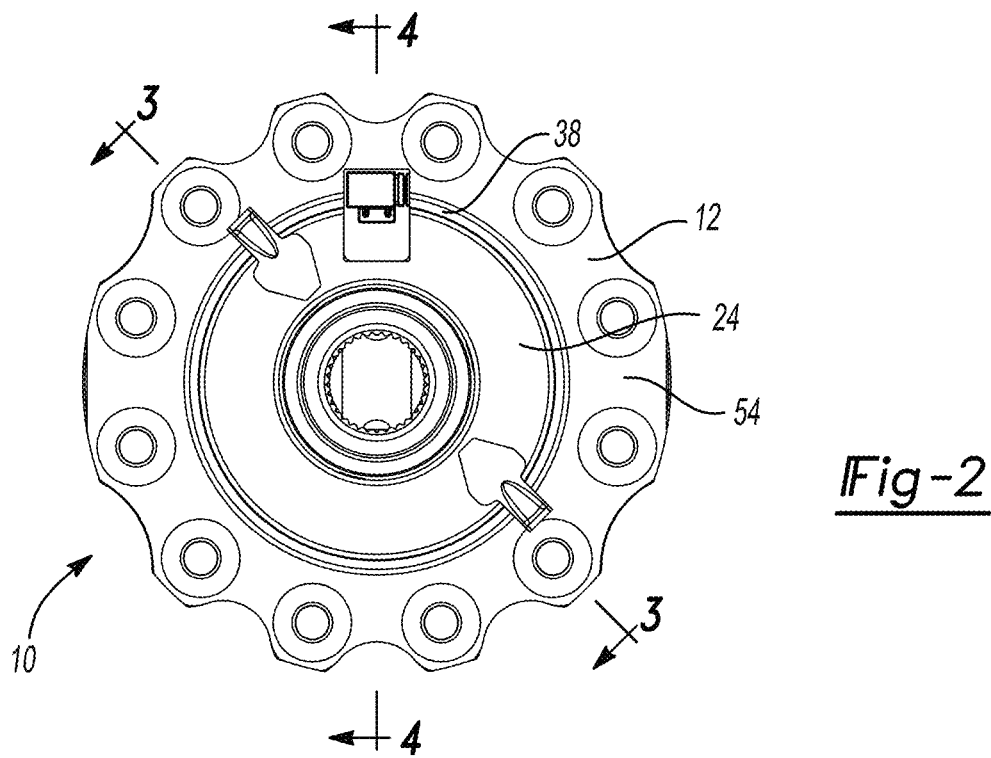
FIG. 2 is a side elevation view of the electronic locking differential of FIG. 1.
Figure 3:
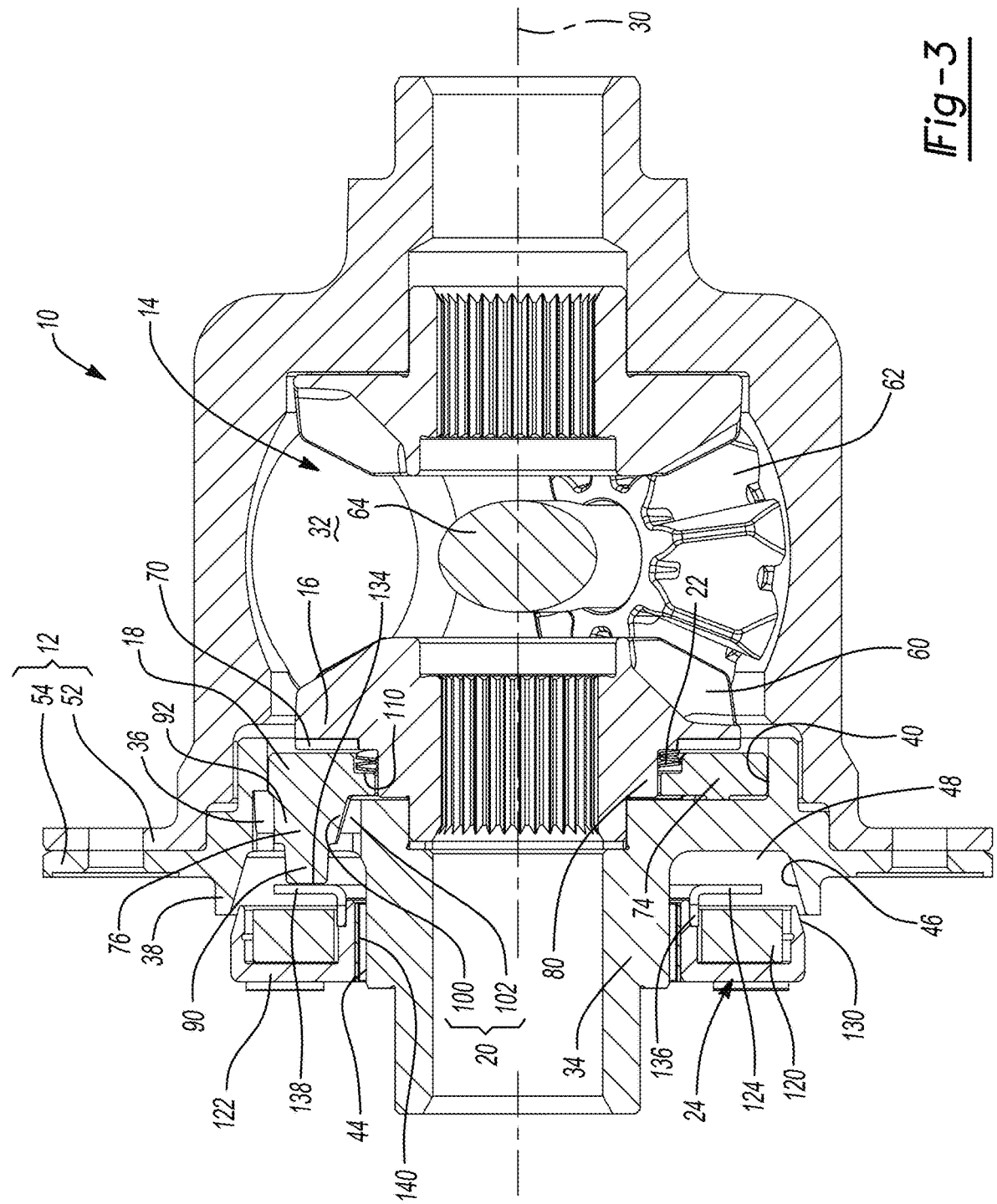
FIG. 3 is a section view taken along the line 3-3 of FIG. 2.
Figure 4:
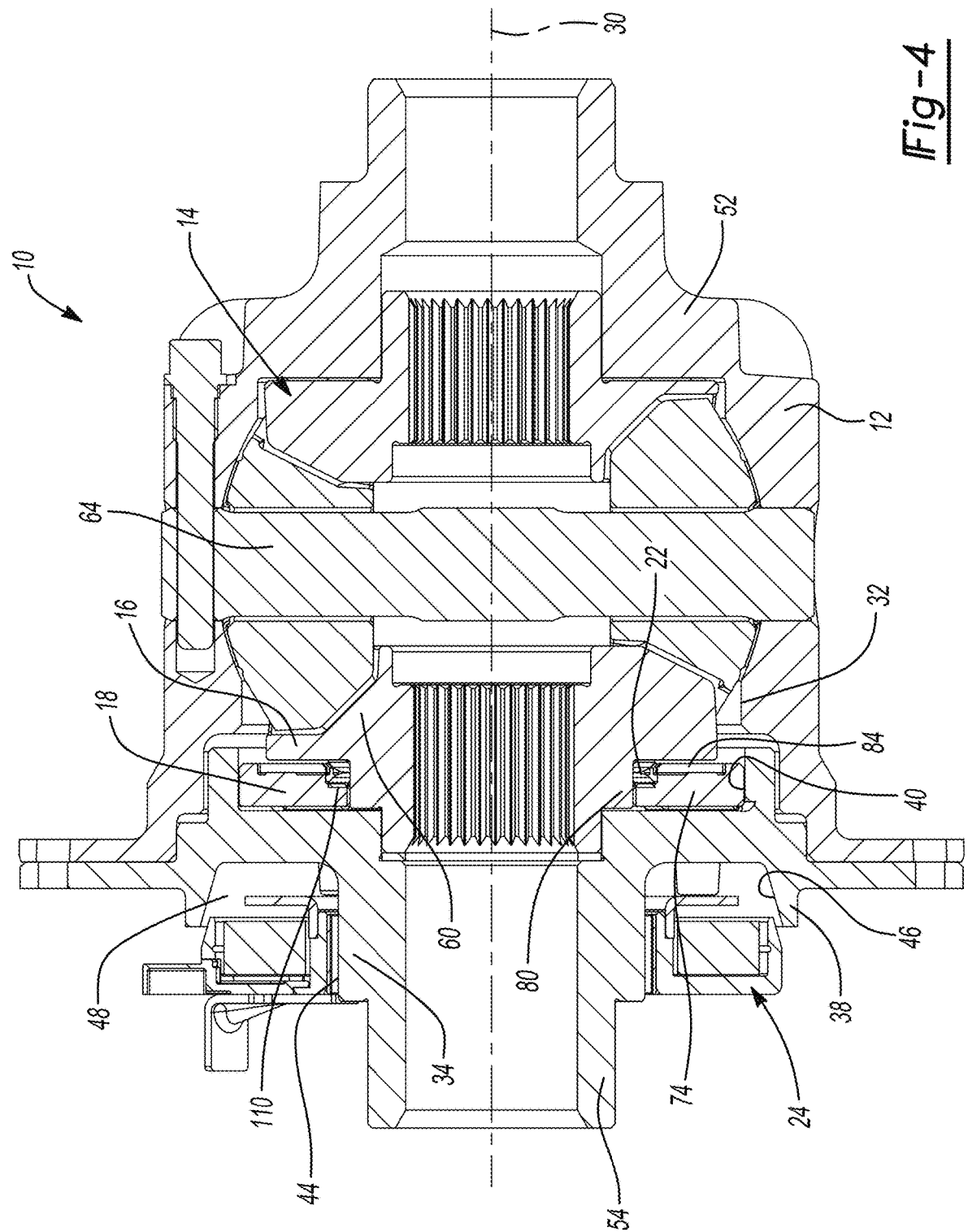
FIG. 4 is a section view taken along the line 4-4 of FIG. 2.

With reference to FIGS. 1-3, an exemplary electronic locking differential constructed in accordance with the teachings of the present disclosure is generally indicated by reference numeral 10. The locking differential 10 can include a differential case or carrier 12, a differential gearset 14, a first dog member 16, a second dog member 18, a cam mechanism 20, a spring 22 and an electromagnet 24.

With reference to FIGS. 3 through 6, the carrier 12 is rotatable about a differential axis 30 and defines an interior cavity 32, an actuator hub 34, a plurality of leg apertures 36 and a circumferentially extending projection 38. A portion of the carrier 12 that defines the interior cavity 32 can define a circumferential guide surface 40. The actuator hub 34 has an exterior hub surface 44 that is disposed concentrically about the differential axis 30. The leg apertures 36 are spaced apart about the differential axis 30 and each of the leg apertures 36 intersects the interior cavity 32. The circumferentially extending projection 38 is coaxial with the exterior hub surface 44 and has a radially inward side that defines a first frustoconical surface 46. An annular pocket 48 is formed radially between the exterior hub surface 44 and the first frustoconical surface 46.

The carrier 12 can be unitarily and integrally formed, but in the particular example shown, the carrier 12 is an assembly that includes a carrier body 52 and a cover 54 that is fixedly coupled to the carrier body 52, for example with threaded fasteners (not shown) or via welding. The circumferentially extending projection 38 can be fixedly coupled to (e.g., unitarily and integrally formed with) the cover 54. Moreover, the cover 54 can optionally define the circumferential guide surface 40.

The differential gearset 14 is received in the interior cavity 32 and includes a side gear 60 that is rotatable relative to the carrier 12 about the differential axis 30. The differential gearset 14 can be configured in any desired manner, and can be a bevel gearset that includes a plurality of differential pinions 62 that are meshingly engaged to the side gear 60. In the particular example shown, each of the differential pinions 62 is rotatably mounted on a cross-pin 64, and the cross-pin 64 is coupled to the carrier 12 for rotation therewith.

The first and second dog members 16 and 18 form a dog clutch that is selectively operable for locking the electronic locking differential 10. The first dog member 16 is fixedly coupled to (e.g., unitarily and integrally formed with) the side gear 60 and has a plurality of first teeth 70. The second dog member 18 is received in the interior cavity 32 and has a body 74 and plurality of legs 76. The body 74 is received onto a hub 80 formed on the side gear 60 and defines a plurality of second teeth 84 that are engagable with the first teeth 70 on the first dog member 16. Each of the legs 76 is fixedly coupled to the body 74 and is received through an associated one of the leg apertures 36.

With reference to FIGS. 3 and 7 through 9, each of the legs 76 has a distal end 90 and a proximal end 92. The distal end 90 is opposite the body 74 and is cylindrically shaped. In the example provided, the distal ends 90 are shaped as right circular cylinders, but it will be appreciated that the distal ends 90 could be shaped differently. The proximal ends 92 are sized to be matingly received in the leg apertures 36 in the carrier 12 with a modicum of clearance that permits relative axial movement of the second dog member 18 relative to the carrier 12 along the differential axis 30, but which limits movement of the second dog member 18 in a rotational direction about the differential axis 30 relative to the carrier 12. In the example provided, the proximal ends 92 are generally shaped as trapezoidal prisms (having radially inner and outer surfaces that are concentric rather than parallel), but it will be appreciated that the proximal ends 92 could be shaped differently than which is shown and described herein.

Returning to FIGS. 3 through 5, the second dog member 18 is axially movable along the differential axis 30 between a first position, in which the second teeth 84 are disengaged from the first teeth 70, and a second position in which the second teeth 84 are engaged with the first teeth 70. If included, the circumferential guide surface 40 can pilot the body 74 of the second dog member 18 to aid in aligning a central axis of the second dog member 18 coincidently with the differential axis 30.

In FIGS. 3 and 7 through 11, the cam mechanism 20 has a plurality of cams 100 and a plurality of followers 102. Each of the cams 100 is fixedly coupled to (e.g., unitarily and integrally formed on/with) a corresponding one of the legs 76, for example on the proximal end 92 at a location between the body 74 and the cylindrically shaped distal end 90 of the corresponding one of the legs 76. Each of the followers 102 is fixedly coupled to (e.g., unitarily and integrally formed with) the carrier 12 and disposed in the interior cavity 32. Each of the cams 100 is engagable to an associated one of the followers 102.

With specific reference to FIG. 3, the spring 22 biases the second dog member 18 along the differential axis 30 toward the first position. In the example shown, the spring 22 is a wave spring that is mounted on the hub 80 on the side gear 60 and is received into a counterbore 110 that is formed into the body 74 of the second dog member 18.

Figure 6:
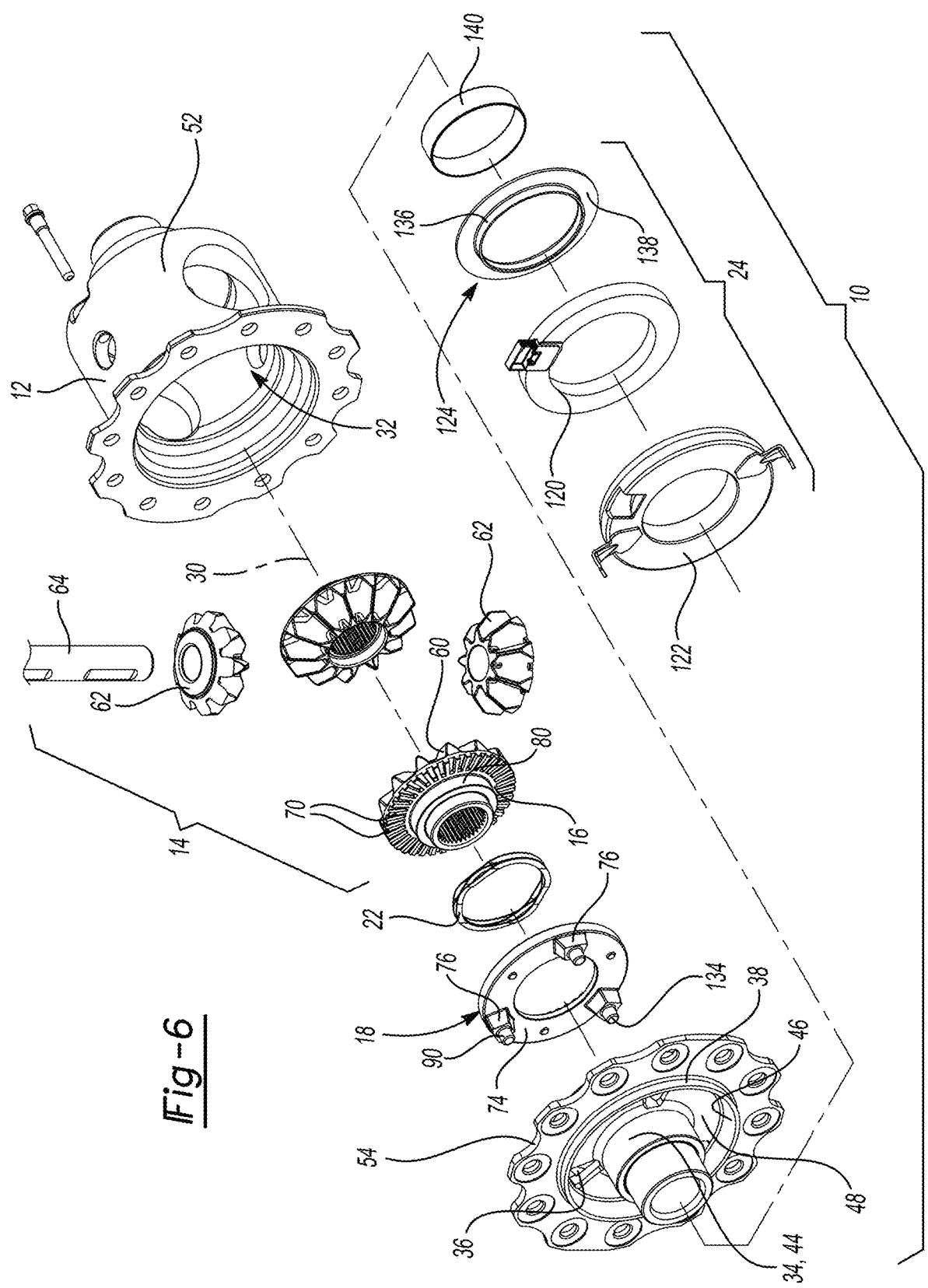
Figure 7:
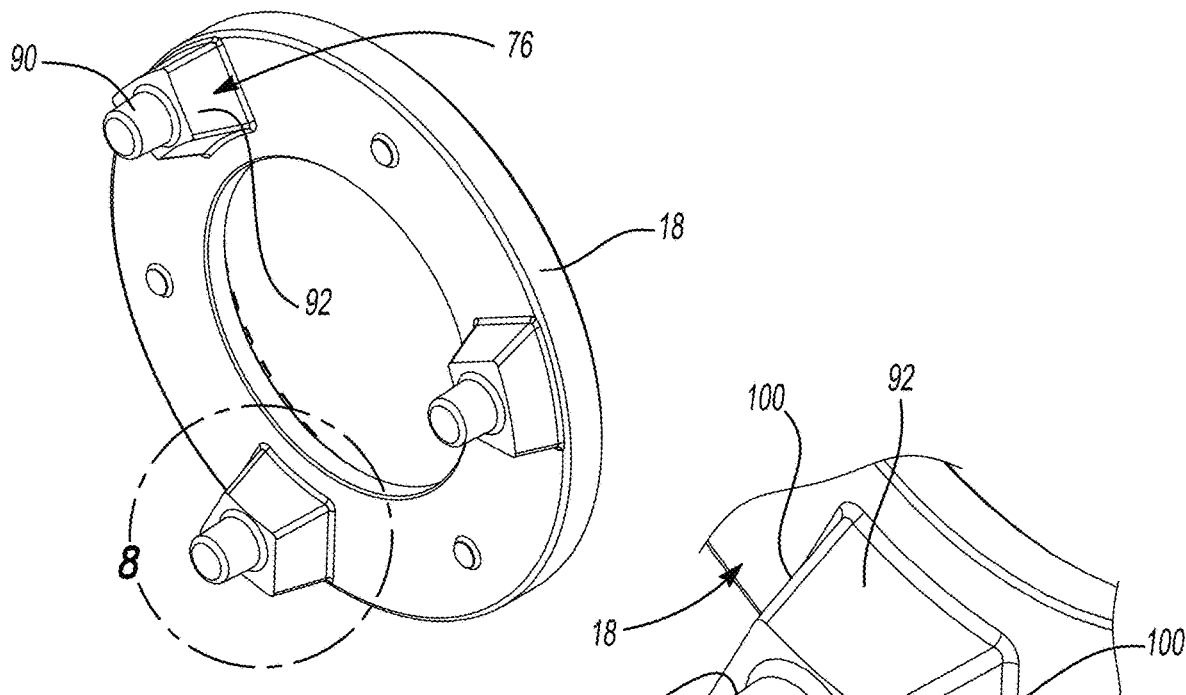
FIG. 7 is a perspective view of a second dog member.
Figure 8:
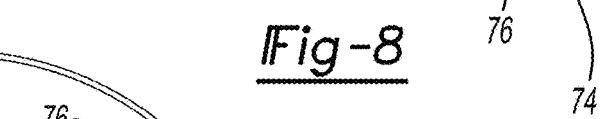
FIG. 8 is an enlarged portion of FIG. 7, illustrating a portion of a second dog member in greater detail.
Figure 9:
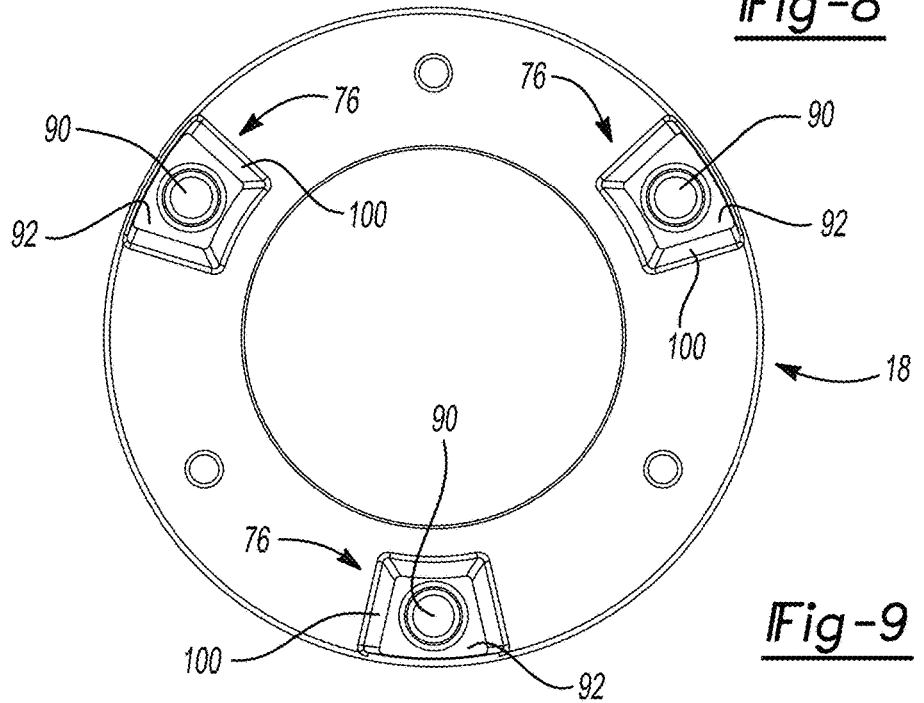
FIG. 9 is an elevation view of the second dog member.
Figure 10:
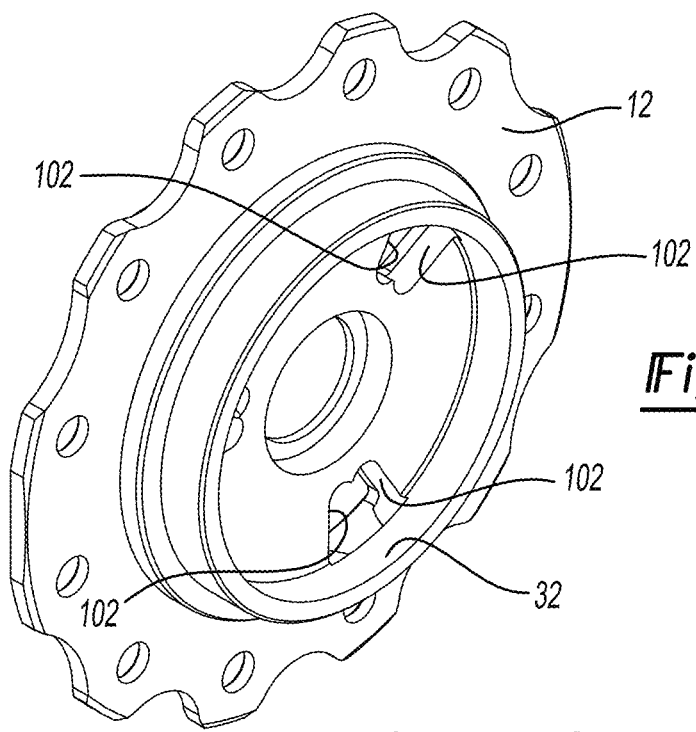
FIG. 10 is a perspective view of a portion of a carrier of the electronic locking differential of FIG. 1, the view illustrating follower formed on the carrier.
Figure 11:
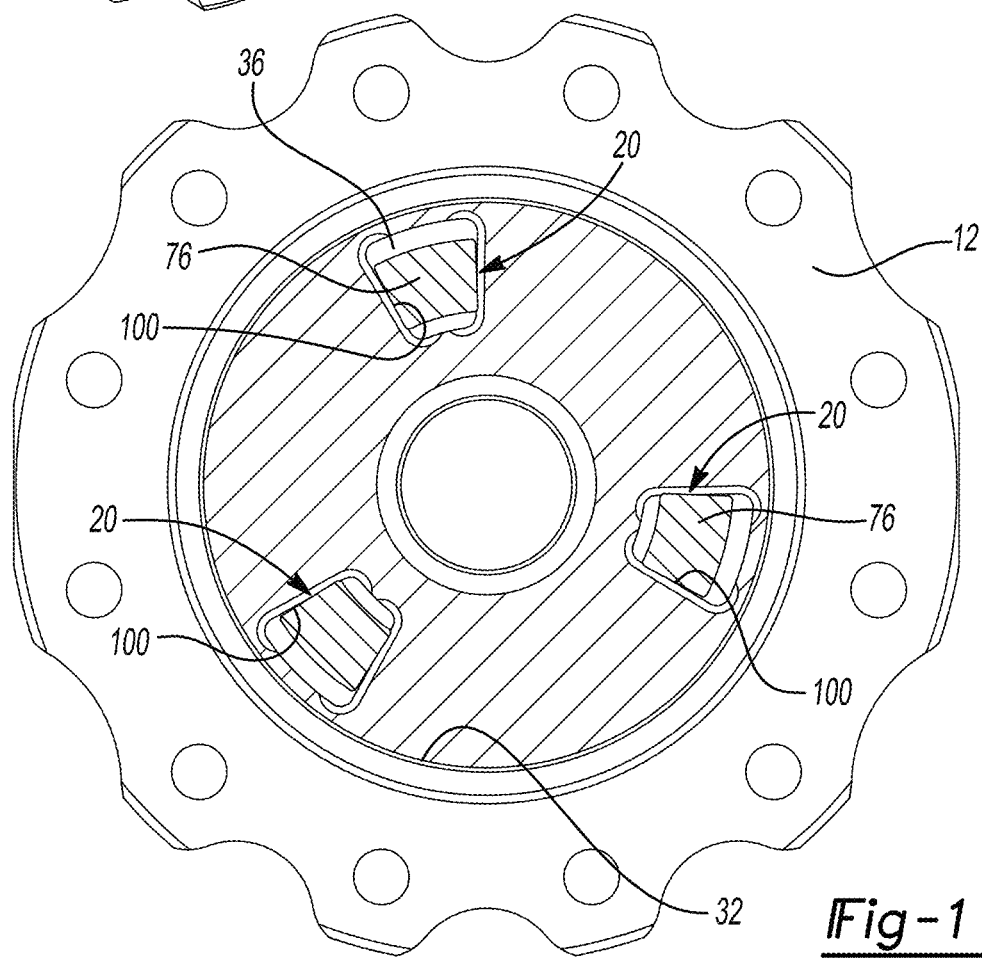
FIG. 11 is a section view of a portion of the electronic locking differential of FIG. 1, the view depicting engagement of the cams on the legs of the second dog member as engaged to the followers on the carrier.

With reference to FIGS. 3 and 6, the electromagnet 24 can include a coil 120, a pole piece 122 and a plunger 124. The pole piece 122 surrounds the coil 120 on three sides (a radially inner side, a radially outer side and an axial end that faces away from the cover 54) and defines a second frustoconical surface 130 that can be concentric with the first frustoconical surface 46 (i.e., the first and second frustoconical surfaces 46 and 130 can be centered about the differential axis 30 and can employ a common interior cone angle). The plunger 124 is fixedly coupled to the pole piece 122 and abuts axial end surfaces 134 of the distal ends 90 of the legs 76. In the example provided, the plunger 124 includes a tubular portion 136 and a flange 138. The tubular portion 136 is disposed concentrically about the differential axis 30 and one axial end of the tubular portion 136 is fixedly coupled to the pole piece 122. The flange 138 can extend radially outwardly from the tubular portion 136. The flange 138 abuts the axial end surfaces 134 of the distal ends 90 of the legs 76. The electromagnet 24 is slidably disposed on the actuator hub 34. In the example provided, a bushing 140 is disposed between the exterior hub surface 44 on the carrier 12 and the electromagnet 24. The bushing 140 permits the carrier 12 to rotate about the differential axis 30 relative to the electromagnet 24, as well as permits the electromagnet 24 to slide along the differential axis 30 relative to the carrier 12.

Figure 5:
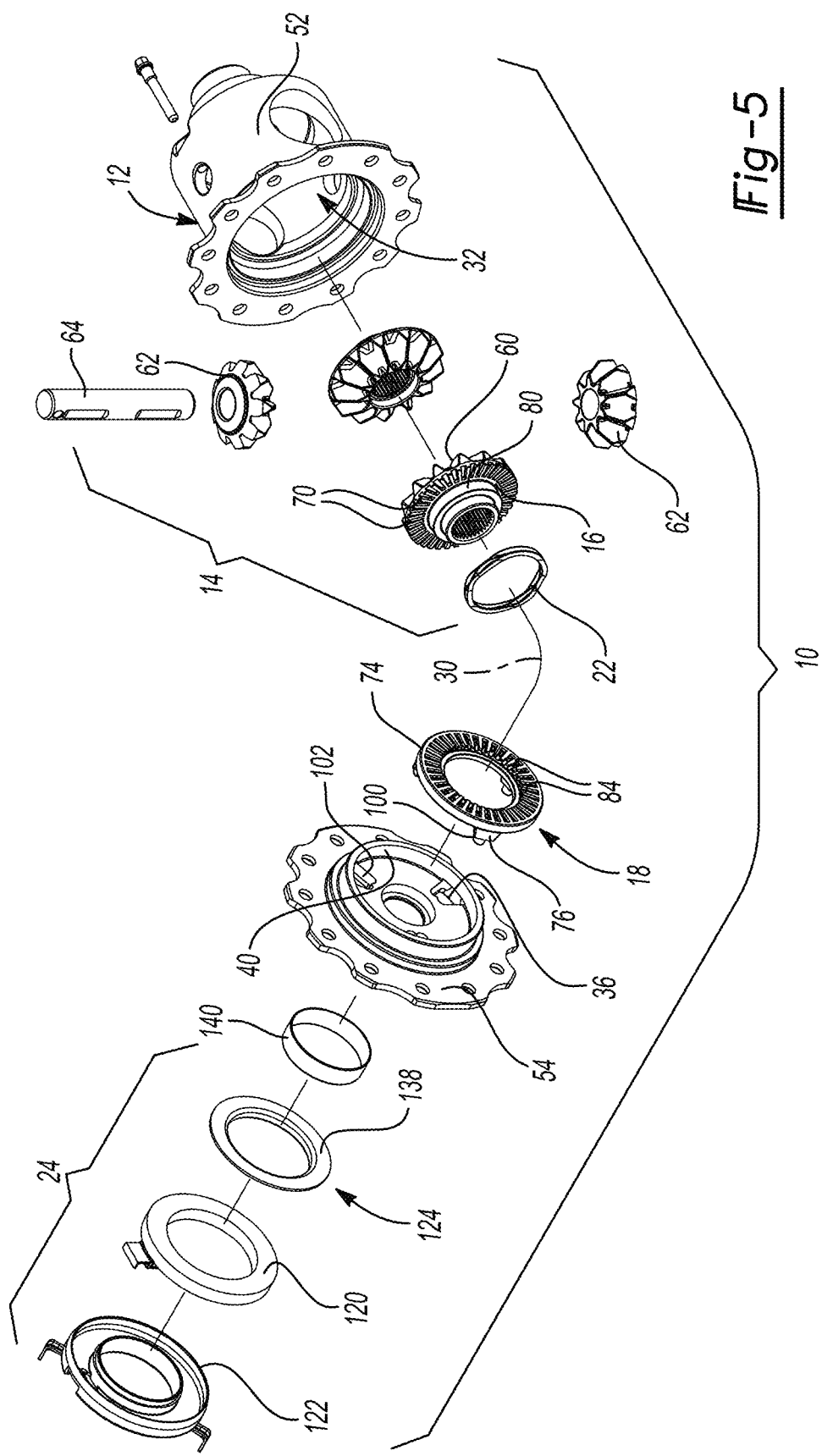
FIGS. 5 and 6 are exploded perspective views of the electronic locking differential of FIG. 1.

With reference to FIGS. 3 and 5, the electromagnet 24 is operable in an energized state to create a magnetic field that draws the second frustoconical surface 130 on the pole piece 122 toward the first frustoconical surface 46 on the carrier 12 to correspondingly move the second dog member 18 toward the second position. When the electromagnet 24 moves along the differential axis 30 toward the carrier 12, the plunger 124, which contacts the axial end surfaces 134 of the distal ends 90 of the legs 76, correspondingly moves the second dog member 18 such that the second teeth 84 on the body 74 of the second dog member 18 move toward the first teeth 70 on the first dog member 16. Since the second dog member 18 has a limited ability to move about the differential axis 30 relative to the carrier 12 (which is due to clearance between the legs 76 and the edges of the leg apertures 36 in the carrier 12), the engagement of the second teeth 84 to the first teeth 70 when the second dog member 18 is in the second position similarly restricts movement of the first dog member 16 and the side gear 60 about the differential axis 30 relative to the carrier 12. In the example provided, the pole piece 122 is spaced apart from the circumferentially extending projection 38 (i.e., so that there is a gap or space between the first and second frustoconical surfaces 46 and 130) when the second dog member 18 is in the second position. It will be appreciated, however, that the first and second frustoconical surfaces 46 and 130 could be configured to contact one another when the second dog member 18 is in the second position.

At least a portion of the electromagnet 24 is disposed in the annular pocket 48 when the electromagnet 24 is operated to create the magnetic field and the second dog member 18 is in the second position. Configuration in this manner is advantageous in that it renders the electronic locking differential 10 relatively more compact than some known configurations. In the particular example shown, a portion of the electromagnet 24 is disposed in the annular pocket 48 when the electromagnet 24 is in the first position.

The cam mechanism 20 is configured to urge the second dog member 18 toward the first dog member 16 when a torque that is greater than or equal to a first predetermined threshold is transmitted through the cam mechanism 20 in a first predetermined rotational direction. In this regard, torque that is applied in the first predetermined rotational direction through the cam mechanism 20 between the carrier 12 and the side gear 60 causes a modicum of rotation of the cams 100 relative to the followers 102. The cam mechanism 20 is configured so that a thrust force is generated in response to the relative rotation between the cams 100 and the followers 102 that is directed into the second dog member 18 so as to urge the second dog member 18 along the differential axis 30 toward the first dog member 16. Accordingly, the cam mechanism 20 helps to maintain engagement of the second teeth 84 with the first teeth 70 when a torque that is greater than or equal to a first predetermined threshold is transmitted through the cam mechanism 20 in the first predetermined rotational direction.

Optionally, the cam mechanism 20 can also be configured to urge the second dog member 18 toward the first dog member 16 when a torque that is greater than or equal to a second predetermined threshold is transmitted through the cam mechanism 20 in a second predetermined rotational direction that is opposite the first predetermined rotational direction.

With reference to FIG. 12, a second electronic locking differential constructed in accordance with the teachings of the present disclosure is generally indicated by reference numeral 10a. The locking differential 10a is constructed similar to the locking differential 10 (FIG. 1) except for the configuration of the leg apertures 36a in the carrier 12a, the configuration of the legs 76a of the second dog member 18a, and the cam mechanism 20a.

With additional reference to FIG. 13, the carrier 12a includes a cover 54a into which the leg apertures 36a are formed. Each of the leg apertures 36a can have a frustoconical portion 150 and a cylindrical portion 152. The frustoconical portion 150 is formed such that its base or wider end is disposed adjacent the second dog ring 18a. The cylindrical portion 152 intersects the narrower end of the frustoconical portion 150 and extends through the exterior surface of the cover 54a.

With reference to FIGS. 12 and 14, the legs 76a of the second dog member 18a are generally frusto-conical in shape, being coupled to the body 74 of the second dog member 18a at their bases or wide ends. Optionally, one or more flat surfaces 160 can be formed along the length of each of the legs 76a. Each of the flat surfaces 160 creates a corresponding interruption in the frustoconical circumferential surface of the legs 76a.

With reference to FIGS. 12 through 14, the cam mechanism 20a includes a plurality of cams 100a and a plurality of followers 102a. Each of the cams 100a is fixedly coupled to (e.g., unitarily and integrally formed on/with) a corresponding one of the legs 76a, while each of the followers 102a is fixedly coupled to (e.g., unitarily and integrally formed on/with) the carrier 12a. In the example provided, each of the cams 100a is the frustoconical circumferential surface that is formed on a corresponding one of the legs 76a, and each of the followers 102a is the frustoconical portion 150 of a corresponding one of the leg apertures 76a.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electronic locking differential comprising:
a carrier that is rotatable about a differential axis, the carrier defining an interior cavity, an actuator hub, a plurality of leg apertures and a circumferentially extending projection, the actuator hub having an exterior hub surface that is disposed concentrically about the differential axis, the leg apertures being spaced apart about the differential axis, each of the leg apertures intersecting the interior cavity, the circumferentially extending projection being coaxial with the exterior hub surface and having a radially inward side that defines a first frustoconical surface, wherein an annular pocket is formed radially between the exterior hub surface and the first frustoconical surface;
a differential gearset received in the interior cavity, the differential gearset including a side gear that is rotatable relative to the carrier about the differential axis;
a first dog member that is fixedly coupled to the side gear, the first dog member having a plurality of first teeth;
a second dog member received in the interior cavity, the second dog member having a body and plurality of legs, the body defining a plurality of second teeth, each of the legs being fixedly coupled to the body and being received through an associated one of the leg apertures, wherein each of the legs has a distal end that is opposite the body, the second dog member being axially movable along the differential axis between a first position, in which the second teeth are disengaged from the first teeth, and a second position in which the second teeth are engaged with the first teeth;
a cam mechanism having a plurality of cams and a plurality of followers, each of the cams being formed on a corresponding one of the legs at a location between the body and the distal end, each of the followers being fixedly coupled to the carrier and disposed in the interior cavity, each of the cams being engagable to an associated one of the followers;
a spring biasing the second dog member along the differential axis toward the first position; and
an electromagnet slidably disposed on the actuator hub, the electromagnet having a pole piece and a plunger that is fixedly coupled to the pole piece, the pole piece defining a second frustoconical surface, the plunger abutting axial end surfaces of the distal ends of the legs, the electromagnet being operable in an energized state to create a magnetic field that draws the second frustoconical surface on the pole piece toward the first frustoconical surface to thereby move the second dog member toward the second position;
wherein at least a portion of the electromagnet is disposed in the annular pocket when the electromagnet is operated to create the magnetic field and the second dog member is in the second position; and
wherein the cam mechanism is configured to urge the second dog member toward the first dog member when a torque that is greater than or equal to a first predetermined threshold is transmitted through the cam mechanism in a first predetermined rotational direction.

2. The electronic locking differential of claim 1, wherein the cam mechanism is configured to urge the second dog member toward the first dog member when a torque that is greater than or equal to a second predetermined threshold is transmitted through the cam mechanism in a second predetermined rotational direction, the second predetermined rotational direction being opposite the first predetermined rotational direction.

3. The electronic locking differential of claim 1, further comprising a bushing mounted between the exterior hub surface and the electromagnet.

4. The electronic locking differential of claim 1, wherein the differential gearset is a bevel gearset that includes a plurality of differential pinions, each of the differential pinions being meshingly engaged to the side gear.

5. The electronic locking differential of claim 4, wherein the differential gearset includes a cross-pin that is mounted to the carrier for rotation therewith, and wherein a pair of the differential pinions are rotatably mounted on the cross-pin.

6. The electronic locking differential of claim 1, wherein the carrier comprises a carrier body and a cover that is fixedly coupled to the carrier body, and wherein the circumferentially extending projection is formed on the cover.

7. The electronic locking differential of claim 6, wherein the followers are formed on the cover.

8. The electronic locking differential of claim 1, wherein the carrier defines a circumferential guide surface on which the body of the second dog member is piloted.

9. The electronic locking differential of claim 8, wherein the carrier comprises a carrier body and a cover that is fixedly coupled to the carrier body, and wherein the circumferential guide surface is formed on the cover.

10. The electronic locking differential of claim 1, wherein the plunger includes a tubular portion and a flange, wherein the tubular portion is mounted to the pole piece and is disposed concentrically about the differential axis, and wherein the flange extends radially outwardly from the tubular portion.

11. The electronic locking differential of claim 1, wherein the distal end of each of the legs is cylindrically shaped.

12. The electronic locking differential of claim 1, wherein each of the cams has a frustoconically shaped cam surface that engages a frustoconically shaped follower surface on a corresponding one of the followers.

13. The electronic locking differential of claim 12, wherein the frustoconically shaped cam surface extends between the body of the second dog member and the distal end of the leg.

14. The electronic locking differential of claim 12, wherein at least one flat surface is formed on each of the legs, the flat surface interrupting the frustoconically shaped cam surface.

* * * * *